USOO5964433A

United States Patent [19]
Nosenchuck

[11] Patent Number: 5,964,433
[45] Date of Patent: Oct. 12, 1999

[54] STAGGERED ACTUATION OF ELECTROMAGNETIC TILES FOR BOUNDARY LAYER CONTROL

[75] Inventor: Daniel M. Nosenchuck, Mercerville, N.J.

[73] Assignee: The Trustees of Princeton Univ., Princeton, N.J.

[21] Appl. No.: 08/751,827

[22] Filed: Nov. 19, 1996

Related U.S. Application Data

[60] Provisional application No. 60/007,379, Nov. 20, 1995.
[51] Int. Cl.⁶ .............................. B64C 1/38; B64C 21/10; B64C 23/06
[52] U.S. Cl. ........................... 244/205; 244/130; 244/204
[58] Field of Search .................................. 244/204, 205, 244/198, 130, 201

[56] References Cited

U.S. PATENT DOCUMENTS

| | | | |
|---|---|---|---|
| 2,763,125 | 9/1956 | Kadosch et al. | 60/230 |
| 2,946,541 | 7/1960 | Boyd | 244/205 |
| 3,095,163 | 6/1963 | Hill | 244/205 |
| 3,162,398 | 12/1964 | Clauser et al. | 244/205 |
| 3,224,375 | 12/1965 | Hoff | 244/130 |
| 3,360,220 | 12/1967 | Meyer | 244/205 |
| 3,390,693 | 7/1968 | Ziemer et al. | 137/807 |
| 3,494,369 | 2/1970 | Inoue | 137/13 |
| 3,662,554 | 5/1972 | De Broqueville | 244/130 |
| 3,851,195 | 11/1974 | Zauderer | 310/11 |
| 3,854,061 | 12/1974 | Rosa | 310/11 |
| 3,880,192 | 4/1975 | Denizov et al. | 137/827 |
| 4,171,707 | 10/1979 | Branover | 137/13 |
| 4,216,800 | 8/1980 | Garnier et al. | 137/807 |
| 4,516,747 | 5/1985 | Lurz | 244/204 |
| 5,040,560 | 8/1991 | Glezer et al. | 137/13 |
| 5,052,491 | 10/1991 | Harms et al. | 166/304 |
| 5,074,324 | 12/1991 | Ng | 137/13 |
| 5,273,465 | 12/1993 | Meng | 440/6 |
| 5,320,309 | 6/1994 | Nosenchuck et al. | 244/205 |
| 5,437,421 | 8/1995 | Nosenchuck et al. | 244/205 |
| 5,791,275 | 8/1998 | Bandyopadhyay | 244/205 |

FOREIGN PATENT DOCUMENTS

| | | |
|---|---|---|
| 931295 | 2/1948 | France . |
| 1031925 | 6/1953 | France ................................. 244/205 |
| 2091847 | 1/1972 | France . |
| 1956760 | 5/1971 | Germany . |
| 273456 | 1/1969 | U.S.S.R. . |
| 491517 | 2/1976 | U.S.S.R. . |
| 1106531 | 3/1968 | United Kingdom . |

OTHER PUBLICATIONS

Nosenchuck, D.M., and Brown, G.L., "The Direct Control of Wall–Shear Stress in a Turbulent Boundary Layer in Single and Multiple Domains," MAE Report T1954 (Princeton Univ.), Aug. 31, 1992.

Nosenchuck, D.M., and Brown, G.L., "Discrete Spatial Control of Wall Shear Stress in a Turbulent Boundary Layer," *Proceedings of Int.l. Conf. on Near–Wall Turb. Flows*, (Ariz. State Univ.), 1993.

Watanabe T., "Magnetohydrodynamic Stability of a Boundary Layer Flow with Suction or Injection Along a Flat Plate," ZAMM 67 (1987) pp. 27–30.

A. Tsinober, "MHD Flow Drag Reduction," *Viscous Drag Reduction in Boundary Layers*, American Institute of Aeronautics and Astronautics, Inc., 1990.

*Primary Examiner*—Virna Lissi Mojica
*Attorney, Agent, or Firm*—Fitzpatrick, Cella, Harper & Scinto

[57] ABSTRACT

The boundary layer of a fluid travelling in a mean-flow direction relative to a surface of a wall of a body is controlled by generating in the fluid a magnetic field $\bar{B}$ having flux lines along the surface of the wall and an electric current density $\bar{J}$ traversing the magnetic flux lines in the fluid to form a control region. The magnetic field $\bar{B}$ and the electric current density $\bar{J}$ create in the control region a force $\bar{J} \times \bar{B}$ that introduces a vorticity distribution $\bar{\omega}$ (x,y,z,t) into the flow. A plurality of such control regions is arranged in an two-dimensional array of control tiles that are actuated such that over the array the vorticity at the wall in the direction transverse to the free-stream direction is reduced and creation of the boundary layer vorticity concentrations in the free-stream direction is inhibited.

13 Claims, 19 Drawing Sheets

FIG. 1(a)
PRIOR ART
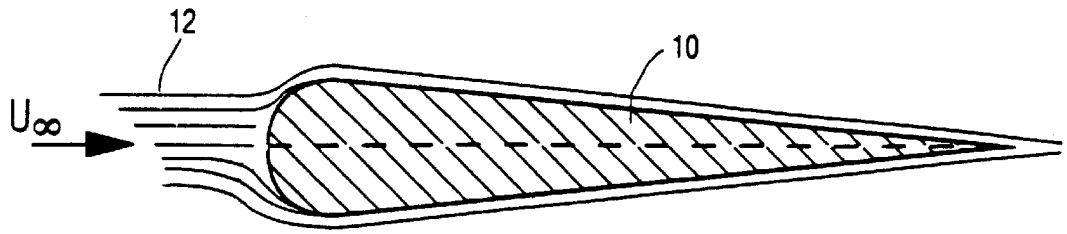
FIG. 1(b)
PRIOR ART
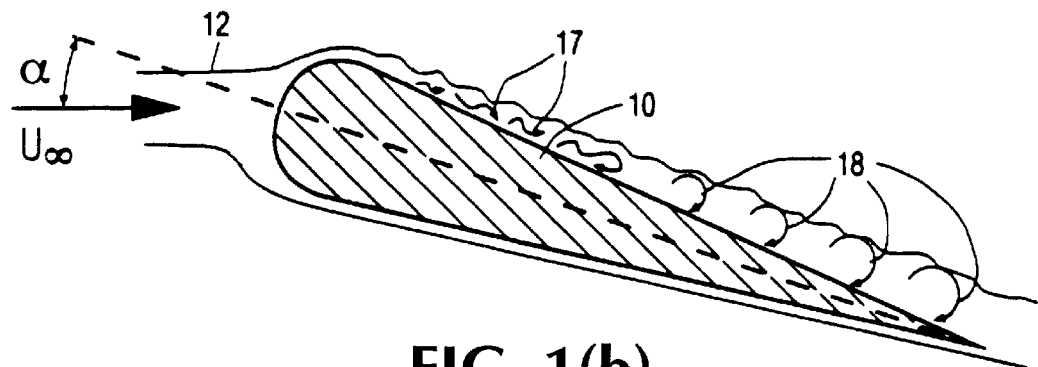
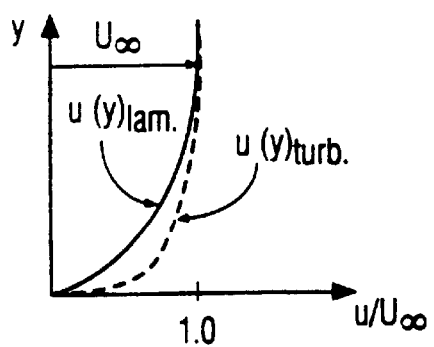
FIG. 2
PRIOR ART

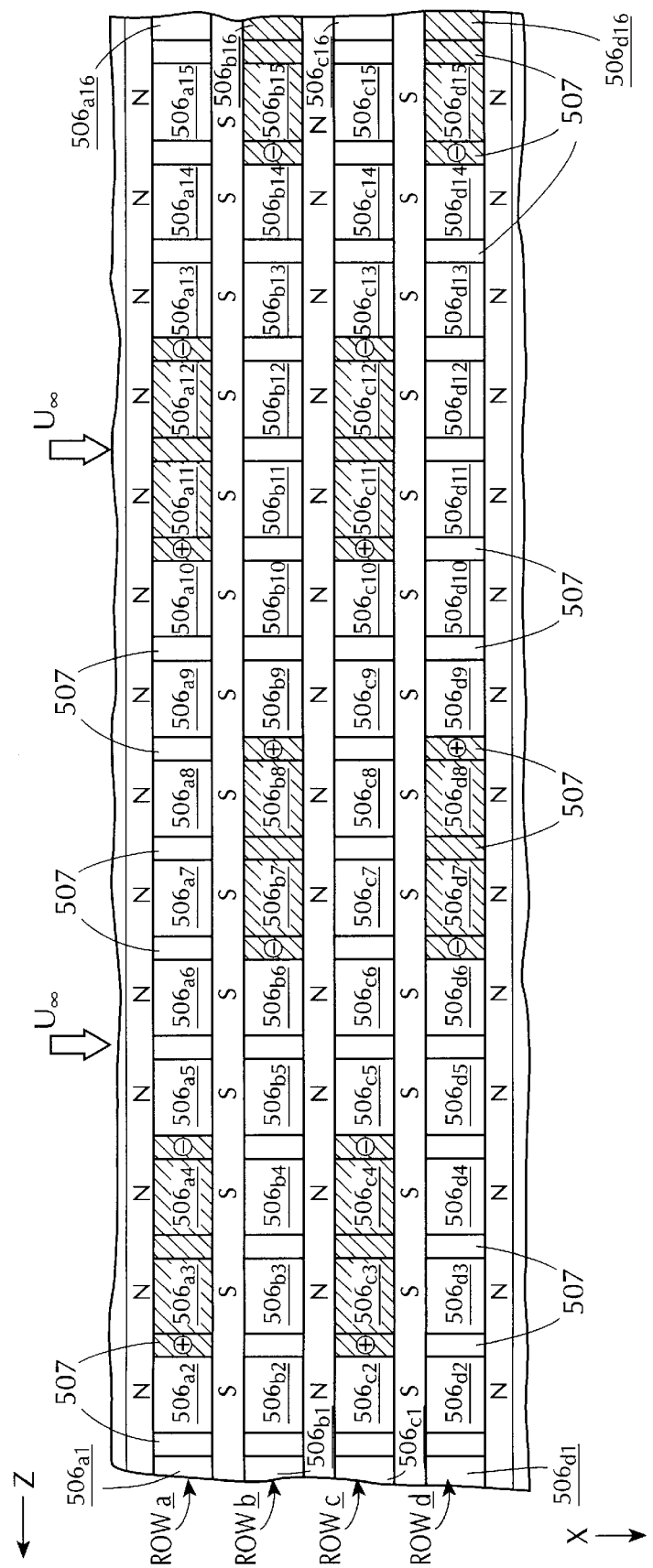

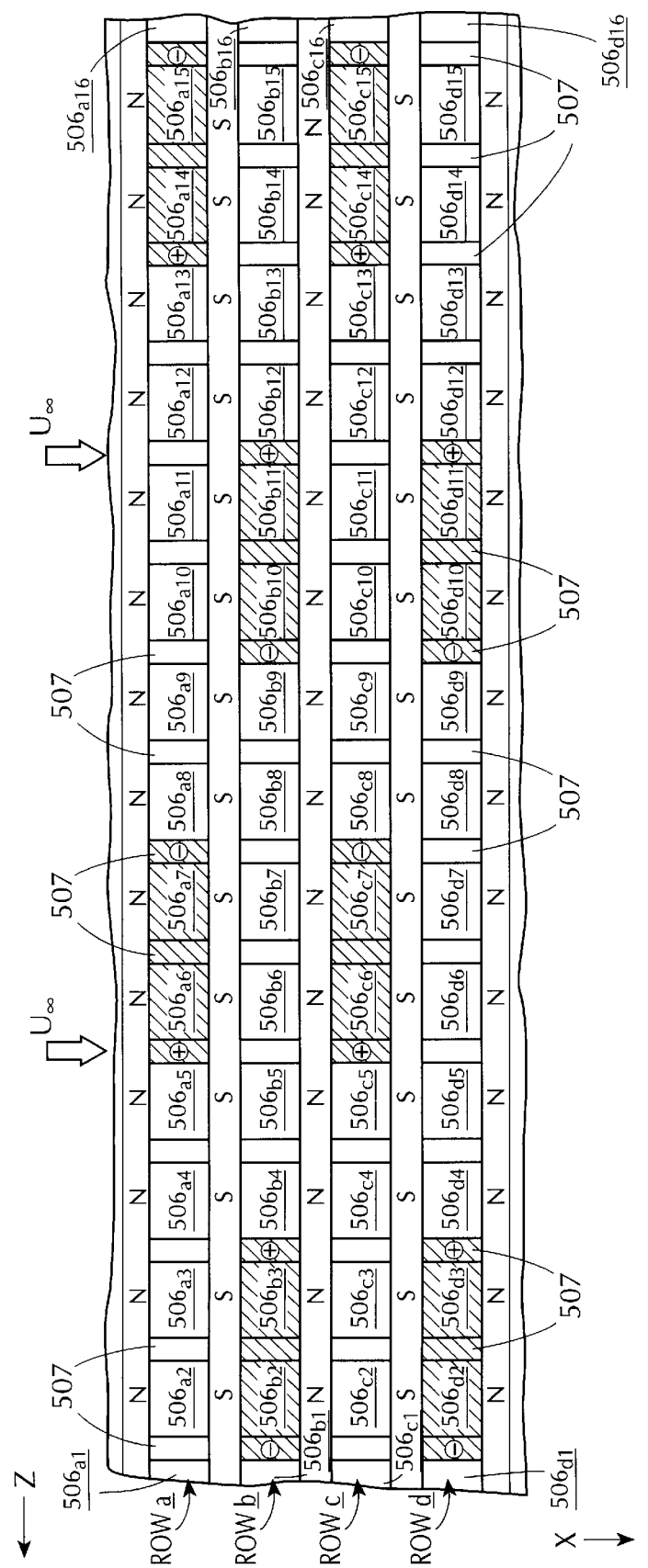

STAGGERED ACTUATION OF ELECTROMAGNETIC TILES FOR BOUNDARY LAYER CONTROL

CROSS-REFERENCE TO RELATED APPLICATION

This application claims the benefit of U.S. Provisional application No. 60/007,379, filed Nov. 20, 1995.

BACKGROUND OF THE INVENTION

1. Field of the Invention

The present invention relates to controlling the flow of a fluid along a wall using multiple electromagnetic tiles and, more particularly, to an improved actuation technique and alternate geometry for an array of such tiles that provides extremely efficient control of the boundary layer along the wall.

2. Description of the Related Art

A viscous fluid, and a body completely immersed in the fluid, form a boundary layer at the body's surface when the fluid and the body move relative to each other. That is, the layer of fluid in contact with the body is essentially at rest, while in an area spaced from the body, the fluid moves at its free-stream velocity. The region between the body and that area is known as a boundary layer.

The boundary layer is laminar at low Reynolds' numbers. (Re=UL/$\upsilon$, where U is a characteristic velocity, such as the free-stream velocity, L is a characteristic dimension of the body, such as the length of a wing chord or boat hull, and $\upsilon$ is the kinematic viscosity of the fluid.) When the Reynolds' number increases, the boundary layer becomes unstable and turbulent. In some cases, it can "separate" from the body.

FIGS. 1($a$) and 1($b$) illustrate fluid flow over a body such as an airfoil. When the airfoil 10 is operating at a small angle of attack $\alpha$, as shown in FIG. 1($a$), the fluid stream 12, with a free-stream velocity $U_\infty$, flows smoothly over the upper surface 14 of the airfoil. As the angle of attack $\alpha$ and/or Reynolds' number increases, the boundary layer may become turbulent, as indicated by the irregular flow 17 shown schematically in FIG. 1($b$). (For purposes of illustration, the boundary layer is depicted in FIG. 1 as much thicker than it is in actuality.) At very high angles of attack the boundary layer may separate from the airfoil, which then stalls. In addition to the loss of lift caused by boundary layer separation, eddies and turbulence 18 develop in the boundary layer.

Boundary layer turbulence increases viscous drag, which may create the need for additional propulsive force, which in turn requires more fuel to be expended to maintain the speed of the airplane, submarine, propeller, etc., to which the airfoil is attached. Moreover, if the flow separates completely, additional pressure drag is created. In addition, a turbulent boundary layer exhibits large velocity and pressure fluctuations, which induce noise and vibration. FIG. 2 plots the velocity in a fluid at a wall (y=0) of a flat plate and in the region of the boundary layer. At y=0, the velocity u is generally considered to be zero. The velocity increases as y increases, and approaches the free-stream velocity $U_\infty$. The velocity u in the mean-flow direction can thus be expressed as u(y).

The average wall shear stress $\tau_w$ in the mean-flow direction is expressed by the following relation:

$$\overline{\tau_w} = \mu \overline{\frac{du}{dy}}\bigg| \tag{1}$$

where $\mu$ is the viscosity of the fluid. (The lines over the terms indicate that they represent time averages, so the equation is valid for both laminar and turbulent flow.)

In turn, the wall shear stress is related to viscous drag as follows:

$$D_{viscous} = \int_{wall} \tau_w dA \tag{2}$$

where dA is an elemental area of the wall.

Equations (1) and (2) show that both $\tau_w$ and $D_{viscous}$ increase as du/dy at the wall increases.

FIG. 2 illustrates u(y) for a laminar boundary layer, shown as a solid line, and u(y) for a turbulent boundary layer, shown in a dotted line, for the same external conditions. It will be appreciated that du/dy at the wall is lower for a laminar boundary than for a turbulent boundary layer at the same location on the wall. Accordingly, viscous drag can be reduced if the flow in the boundary layer can be maintained laminar.

Various approaches have been taken to stabilize boundary layer flow and/or delay boundary layer separation. One such approach consists of optimizing the geometry of the airfoil to achieve a maximum possible angle of attack. However, even an optimum airfoil shape only allows the airfoil to operate at limited angles of attack. Another approach involves "tripping" a laminar boundary layer to cause it to become turbulent prematurely. Although that increases viscous drag, it can delay boundary layer separation.

Conventional approaches for controlling the boundary layer along a surface of an object have also included providing suction or injection of air through fine slits in the airfoil surface to supply or withdraw energy from the boundary layer. However, in addition to the burden of providing fine slits over the surface of the object, such approaches require extensive tubing networks to supply the force necessary for suction or injection. Accordingly, this approach adds considerably to the overall weight and complexity of the object, which is generally inconsistent with the design objectives of most applications (such as aircraft or submarines).

As a result, those more conventional arrangements do not achieve boundary layer control in an efficient, practical and easily implemented fashion.

On the other hand, a particularly effective boundary layer control technique, which relies on electromagnetic forces to reorganize boundary layer flow in a wholly novel manner that reduces drag, is discussed in U.S. Pat. No. 5,437,421. That technique uses multiple electromagnetic control regions, each of which is formed by North and South magnetic poles and electrodes providing an anode and a cathode, as shown in FIG. 3. FIG. 4 shows a two-dimensional array of control region tiles formed by magnets M and electrodes E, with the tiles aligned both in a direction generally along the free-stream flow direction and generally orthogonal to that direction.

In a preferred embodiment of the invention in U.S. Pat. No. 5,537,421, individual tiles in the array are actuated so that similarly situated tiles in each of multiple four-tile sub-arrays making up the entire array are actuated simultaneously. If those "equal-phase" tiles ($\phi_1$, $\phi_2$, $\phi_3$, $\phi_4$) in the sub-arrays are actuated at the proper frequency, the flow in the boundary layer is forced by the vector product $\overline{L}$ of the applied magnetic field $\overline{B}$ and electric current $\overline{J}$ in the fluid to organize into a plurality of rotational flow regions R that effect a dramatic reduction in drag.

The critical actuation frequency $f_{crit.}$ is determined experimentally and results in a boundary layer flow profile $u(y)_{crit.}$ schematically shown in FIG. 5, the significance of which is explained in more detail below in connection with the detailed discussion of preferred embodiments of the present invention.

The technique described in U.S. Pat. No. 5,437,421 improved greatly over theretofore conventional boundary layer control techniques. However, it has certain drawbacks and limitations discussed in more detail below. The effort to overcome those drawbacks and limitations led to the present invention, which is an improvement over the technique of using electromagnetic forces to control boundary layer flow as disclosed in U.S. Pat. No. 5,437,421 (and related U.S. Pat. No. 5,320,309).

SUMMARY OF THE INVENTION

It is an object of the present invention to provide improved control of the boundary layer in the flow over a body to reduce the viscous drag on the body.

In accordance with an aspect of the present invention, an apparatus for controlling a boundary layer in a flow of an electrically conductive fluid moving relative to a surface in a free-stream direction comprises a plurality of selectively actuatable control region tiles distributed over the surface in an array extending in the free-stream direction and a direction transverse thereto, each tile being bounded by magnetic field generating means for generating in the fluid a magnetic field $\overline{B}(x,y,z,t)$ having flux lines with a predetermined orientation with respect to the free-stream direction and electric current generating means for generating in the fluid an electric current density $\overline{J}(x,y,z,t)$ traversing the magnetic flux lines, wherein the magnetic field generating means and the electric current generating means are disposed relative to each other such that actuation of a particular tile generates a magnetic field $\overline{B}$ and electric current density $\overline{J}$ that create in the flow a force $\overline{L}(x,y,z,t) = \overline{J} \times \overline{B}$ and introduce a resulting vorticity distribution $\omega$ $(x,y,z,t)$, and control means for selectively actuating the tiles to create control regions that introduce a vorticity distribution into the flow over each control region such that over the array the vorticity at the wall in the direction transverse to the free-stream direction is reduced and creation of boundary layer vorticity concentrations in the free-stream direction is inhibited.

BRIEF DESCRIPTION OF THE DRAWINGS

The various aspects of the present invention can be best understood by reference to the detailed description of preferred embodiments set forth below taken with the drawings, in which:

FIGS. 1(a) and 1(b) schematically depict fluid flow around an airfoil and the effect of flow conditions on the boundary layer formed on the airfoil surface.

FIG. 2 depicts a fluid velocity profile in a typical boundary layer.

FIG. 6, comprising

FIG. 7, comprising

FIG. 9, comprising FIGS. 9(a) to 9(h), shows another embodiment of the present invention.

DETAILED DESCRIPTION OF PREFERRED EMBODIMENTS

The present invention organizes the flow in the boundary layer in a manner that reduces viscous drag even more than the techniques in U.S. Pat. No. 5,320,309 and U.S. Pat. No. 5,437,421.

Figure 3A:
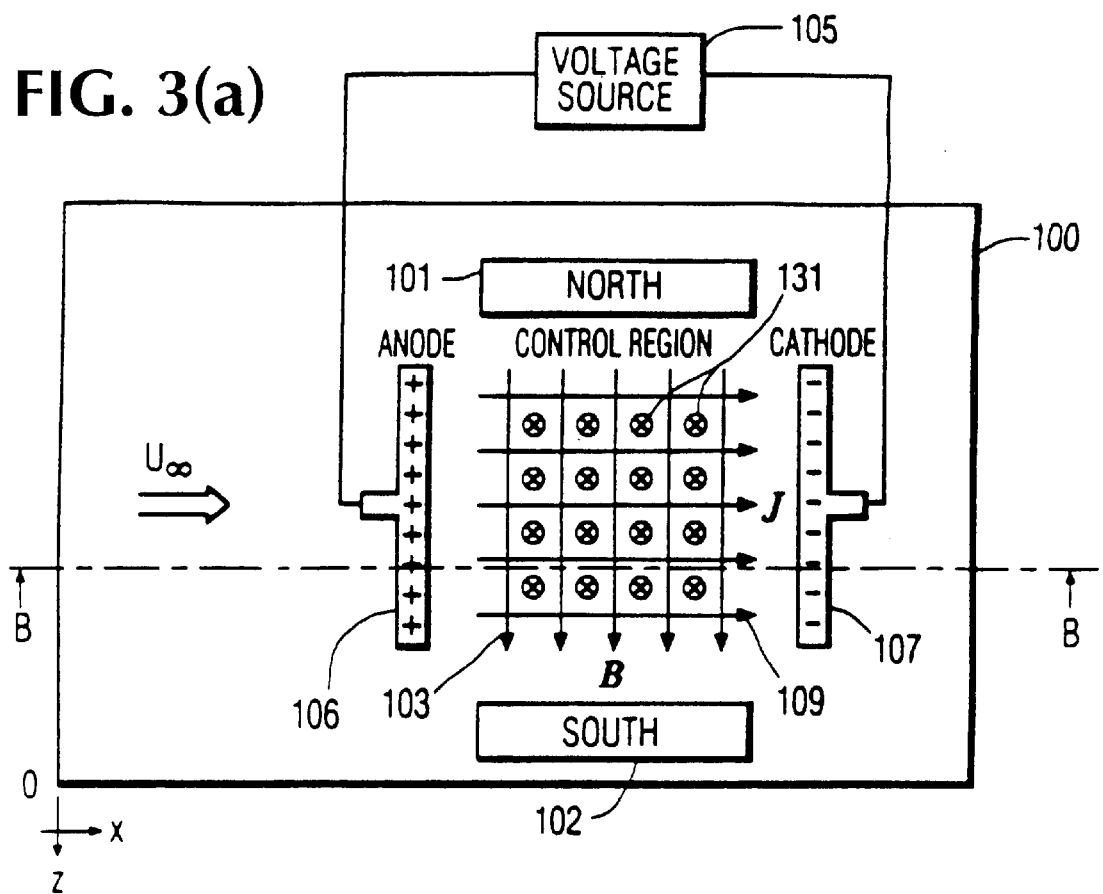
FIG. 3(a) is a platform view of a magnetic boundary layer control device as disclosed in U.S. Pat. No. 5,437,421 with a single control region that illustrates principles of the present invention.

FIGS. 3(a) and (b) illustrate a single electromagnetic control region that forms an element both of the systems disclosed in those patents and of the present invention. (This control region forms a basic building block of the arrays of the present invention and U.S. Pat. No. 5,437,421, and is disclosed in that patent and in U.S. Pat. No. 5,320,309, both of which are incorporated herein by reference as if set forth in full.)

Figure 3B:
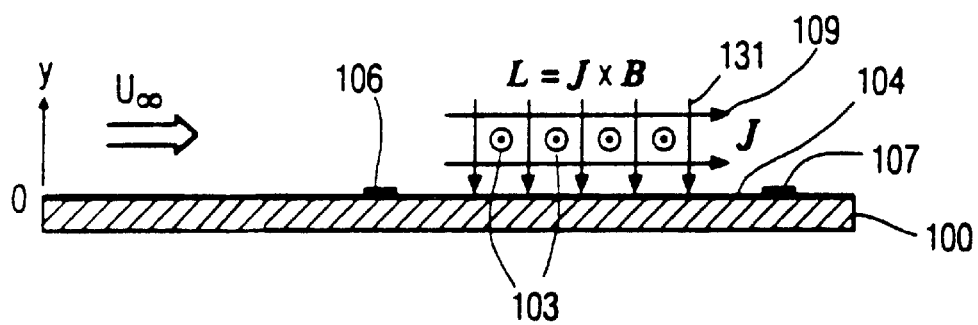
FIG. 3(b) is a cross-section along line B—B of FIG. 3(a).

A wall or plate 100 is provided with a magnet having a North pole 101 and a South pole 102 for generating a magnetic field $\overline{B}$ with flux lines 103. The flux lines 103 enter and exit the surface 104 of the wall, thus being generally oriented parallel to the wall surface 104 and normal to the free-stream fluid flow direction x, although they have significant y-components proximate to the magnets. (The coordinate system used throughout is shown in FIGS. 3(a) and 3(b).)

The magnetic poles 101 and 102 shown in FIG. 3(a) can be provided by any suitable magnet (not shown) beneath the plate 100 (that is, on the side opposite the surface 104), and the plate is a non-ferrous material that allows free passage of magnetic flux. An electromagnet can also be used. The magnetic poles can, of course, be provided by any suitable structure. For example, the poles of one or more magnets can be placed flush with the surface 104 so as to form a part of the surface itself, and can even protrude from the surface.

A voltage source 105 attached across electrodes 106 and 107 generates an electric current density $\overline{J}$, represented by arrows 109, in the fluid between the two electrodes. Of course, if the plate 100 is electrically conductive, the electrodes 106 and 107 are insulated from the plate.

The fluid is conductive and the free-stream fluid flow is represented by the large arrow $U_\infty$. The direction of the current flow through the conductive fluid is in the direction from an anode electrode 106 to a cathode electrode 107 such that the current density can be expressed generally as a vector $\overline{J}$ parallel to the mean flow direction x of the fluid medium, although the lines of electric current also have significant y-components proximate to the electrodes. As depicted in FIG. 3(b), a Lorentz force $\overline{L}$, represented by arrows 131, resulting from the interposition of the electric current and magnetic field, is expressed as $\overline{J} \times \overline{B}$, the vector- or cross-product of $\overline{J}$ and $\overline{B}$ acting in the control region in a direction generally normal to and toward the wall 100, although near the edges of the control region bounded by the magnetic poles and the electrodes, $\overline{L}$ has x- and z-components that are of great significance to the present invention.

FIG. 6 shows an embodiment of the invention that demonstrates flow control using a novel two-dimensional array of control region tiles actuated in accordance with the present invention. The array includes a series of spaced-apart permanent magnets 401. The poles are arranged as alternate North and South poles, indicated by the designations "N" and "S" in FIG. 6. (In addition, linking magnets, as shown in FIG. 10(b) of U.S. Pat. No. 5,437,421, will enhance the magnetic flux, in accordance with the discussion in that patent.) A two-dimensional array of control region tiles 406 is formed by separately actuatable electrodes 407. In FIGS. 6(a) to 6(d), the flux lines B are omitted for clarity from all but the actuated tiles.

The array shown in FIG. 6 can be made as large as desired. The electrodes 407 are disposed to provide an array in which the control region tiles are staggered in the spanwise or z-direction rather than being aligned along the mean-flow or x-direction as in U.S. Pat. No. 5,437,421. That is, the control region tiles, say $406_{a1}$, $406_{a2}$, $406_{a3}$ . . . , in row a are offset at a pitch of one-half of the tile width (in the z-direction) from the control region tiles in the next row b. Thus, the tiles in every other row are aligned in the x-direction.

It is not necessary to the invention that adjacent rows of tiles be arranged at a pitch of one-half of the tile width. In accordance with the principles of the present embodiment of the invention, the offset may be any fractional part of a tile width. For example, the pitch may be one-third, in which case the tiles in every third row would be aligned in the x-direction.

FIGS. 6(a) to 6(d) illustrate how the adjacent rows are actuated for flow control by a control circuit provided for that purpose in accordance with the illustrated embodiment of the present invention, and each of those figures shows the actuation condition of the electrodes 407 in one phase of a four-phase actuation cycle. For each row of tiles, the electrodes 407 are selectively connected to positive and negative voltages as shown in FIGS. 6(a) to 6(d).

The control region tiles are actuated in a four-phase cycle, with FIGS. 6(a), 6(b), 6(c) and 6(d) showing phases $\phi_1$, $\phi_2$, $\phi_3$ and $\phi_4$, respectively. The "+" signs in FIGS. 6(a) to 6(d) indicate positive electrodes and the "−" signs indicate negative electrodes. Each phase has a 25% duty cycle, so that the actuation time of a given phase is 25% of the total actuation time for all four phases. Those skilled in the art will easily be able to provide a suitable control circuit for actuating the array in accordance with the principles discussed herein. For example, a solid-state switching circuit operated under the influence of a suitable clock circuit can provide the required electrical connections to selected electrodes 407 at the proper times. The frequency of actuation is determined according to the relation:

$$f \propto \frac{U_c}{\Delta x} \tag{3}$$

where f is the frequency of actuation, $U_c$ is a characteristic convection velocity of a perturbation introduced by a tile actuation (related to the free-stream velocity $U_\infty$ and the geometry and actuation conditions of the array), and $\Delta x$ is the separation in the streamwise (x) direction of two tiles having the same spanwise (z) coordinate. An optimum frequency of actuation can also be determined experimentally.

Figure 6A:
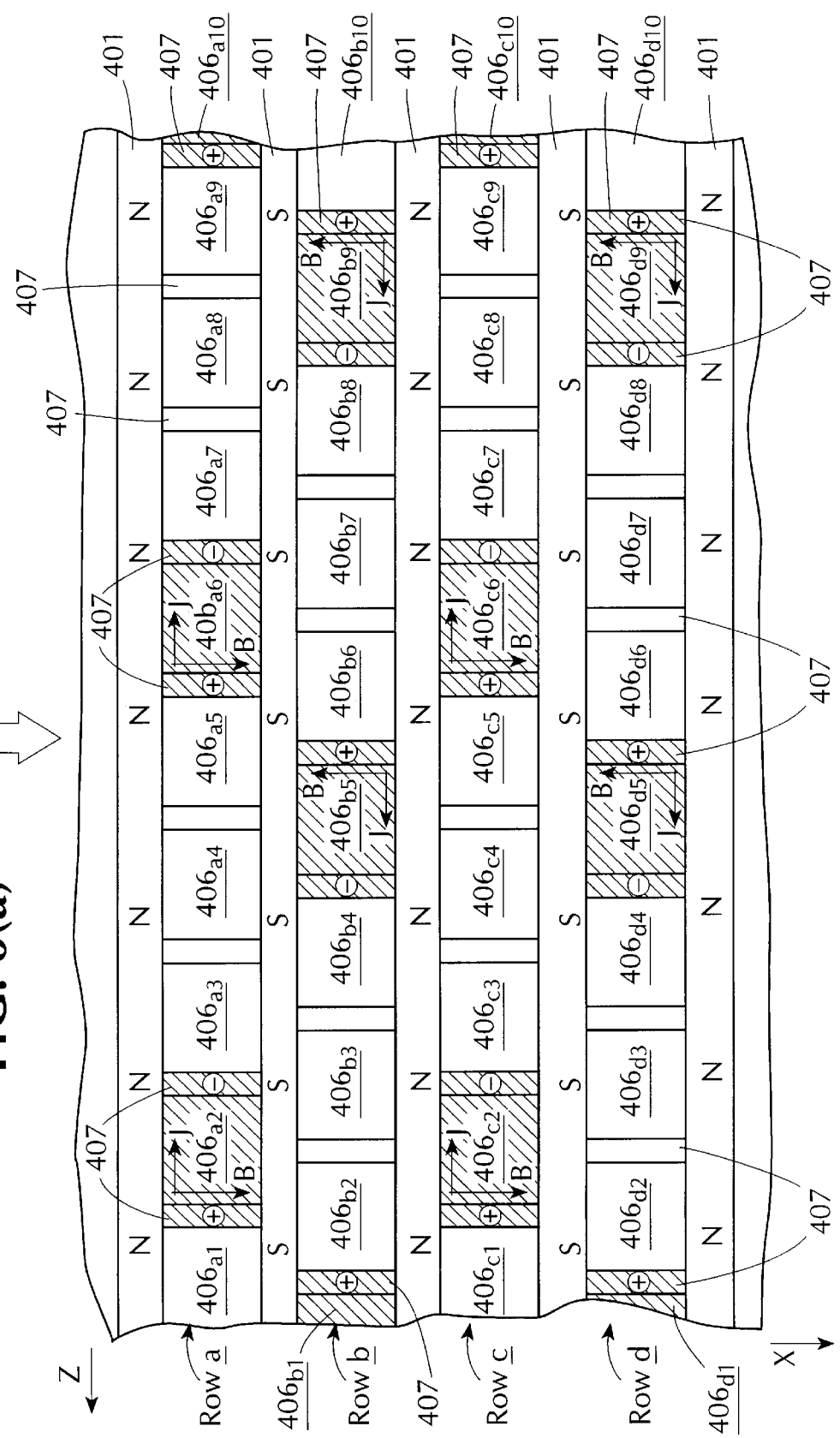
FIGS. 6(a) to 6(d), shows an embodiment of a two-dimensional array of control region tiles, and a method of actuating the tiles, in accordance with the present invention.
Figure 6B:
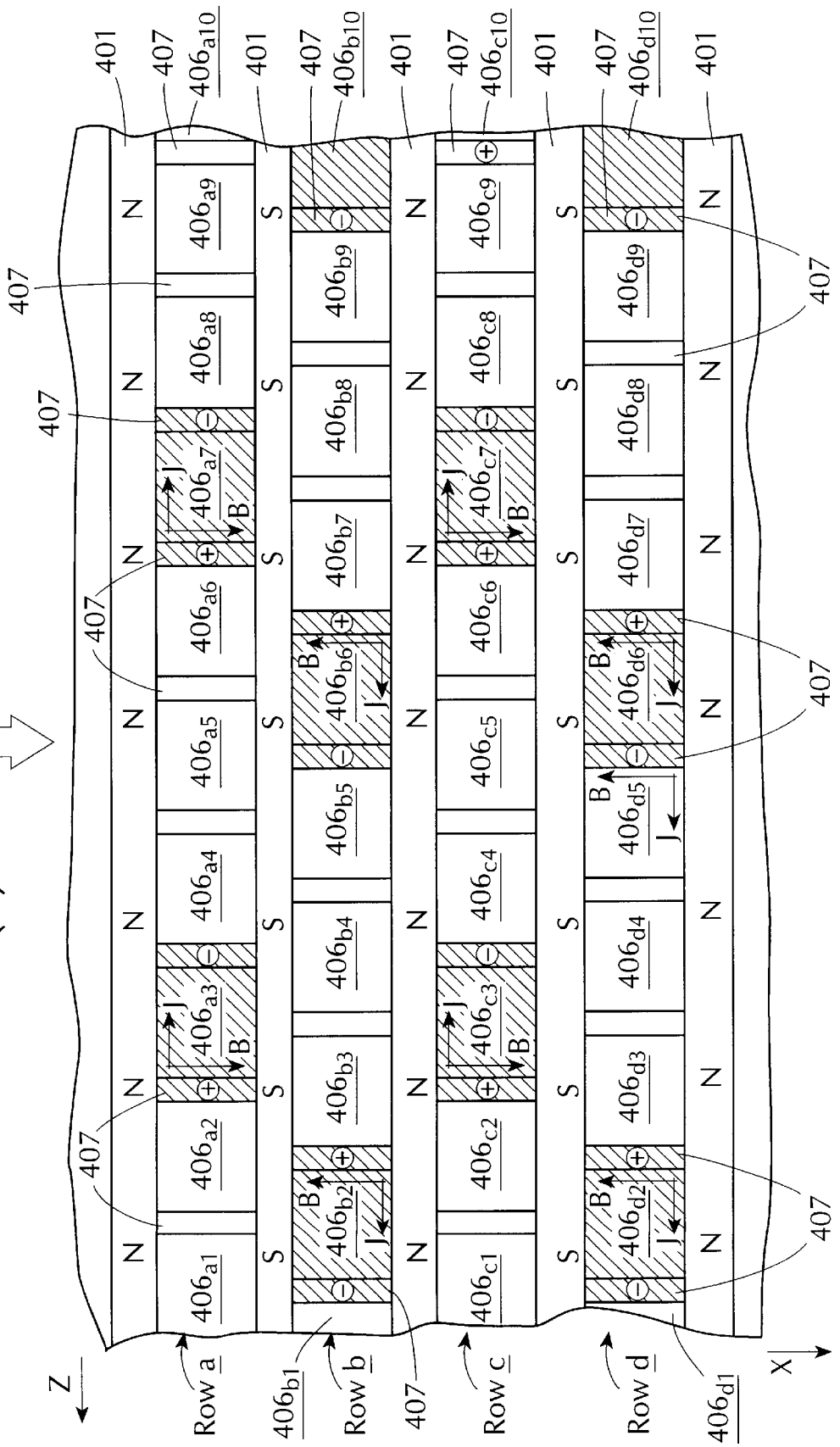
Figure 6C:
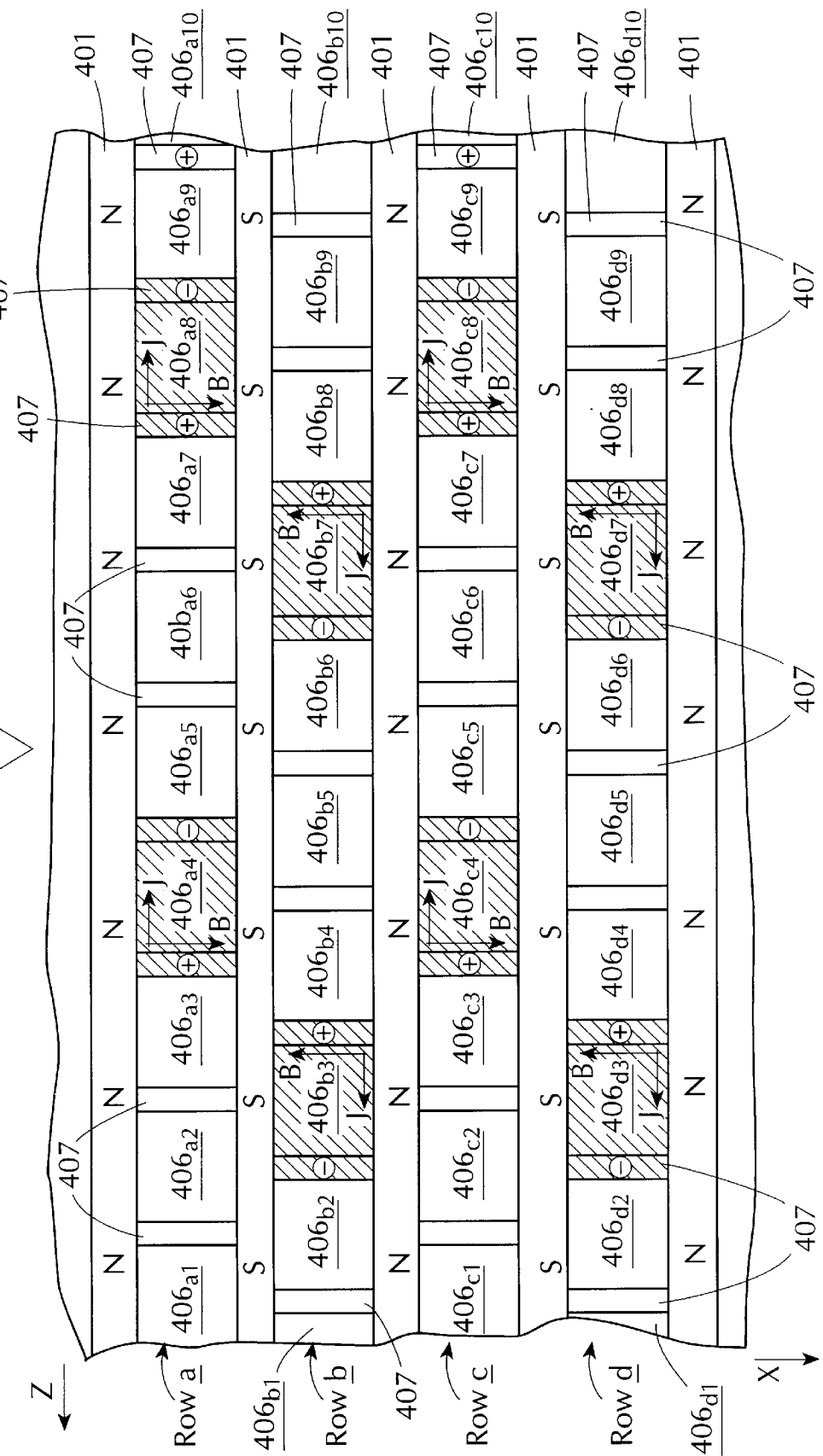

By referring to FIGS. 6(a) to 6(c), it will be appreciated that the actuation pattern for a four-phase cycle is as shown in Table 1 (the entries in Table 1 represent the subscript of the tiles in FIG. 6; for example, "a2" in Table 1 refers to tile $406_{a2}$ in FIG. 6).

TABLE 1

Figure 6D:
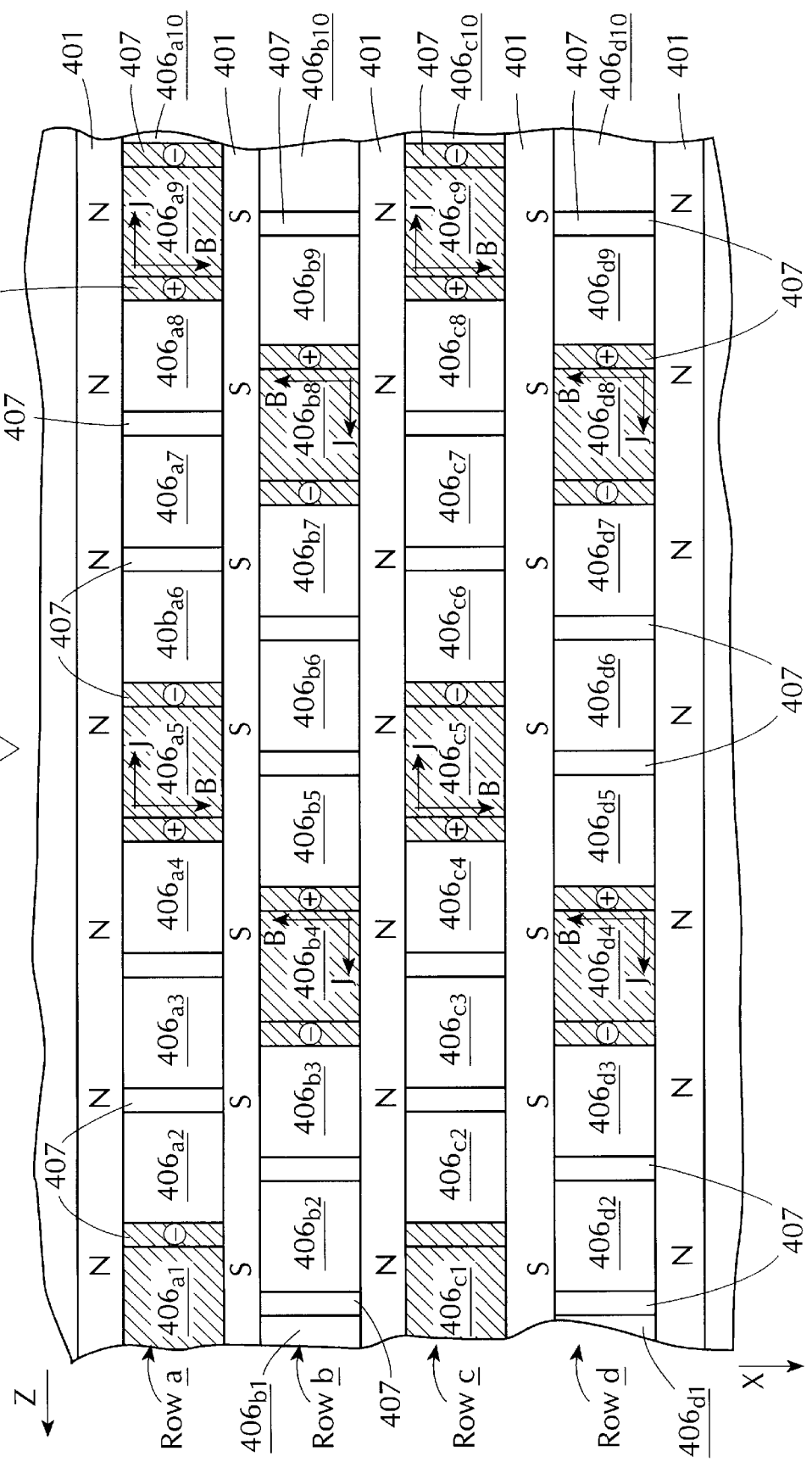

|  | Row a | Row b | Row c | Row d |
|---|---|---|---|---|
| $\phi_1$-FIG. 6(a) | a2, a6, a10, . . . | b1, b5, b9, . . . | c2, c6, c10, . . . | d1, d5, d9, . . . |
| $\phi_2$-FIG. 6(b) | a3, a7, . . . | b2, b6, b10, . . . | c3, c7, . . . | d2, d6, d10, . . . |
| $\phi_3$-FIG. 6(c) | a4, a8, . . . | b3, b7, . . . | c4, c8, . . . | d3, d7, . . . |
| $\phi_4$-FIG. 6(d) | a1, a5, a9, . . . | b4, b8, . . . | c1, c5, c9, . . . | d4, d8, . . . |

This actuation pattern, at the proper frequency determined as discussed above, controls the boundary layer flow in accordance with the following principles.

Figure 4:
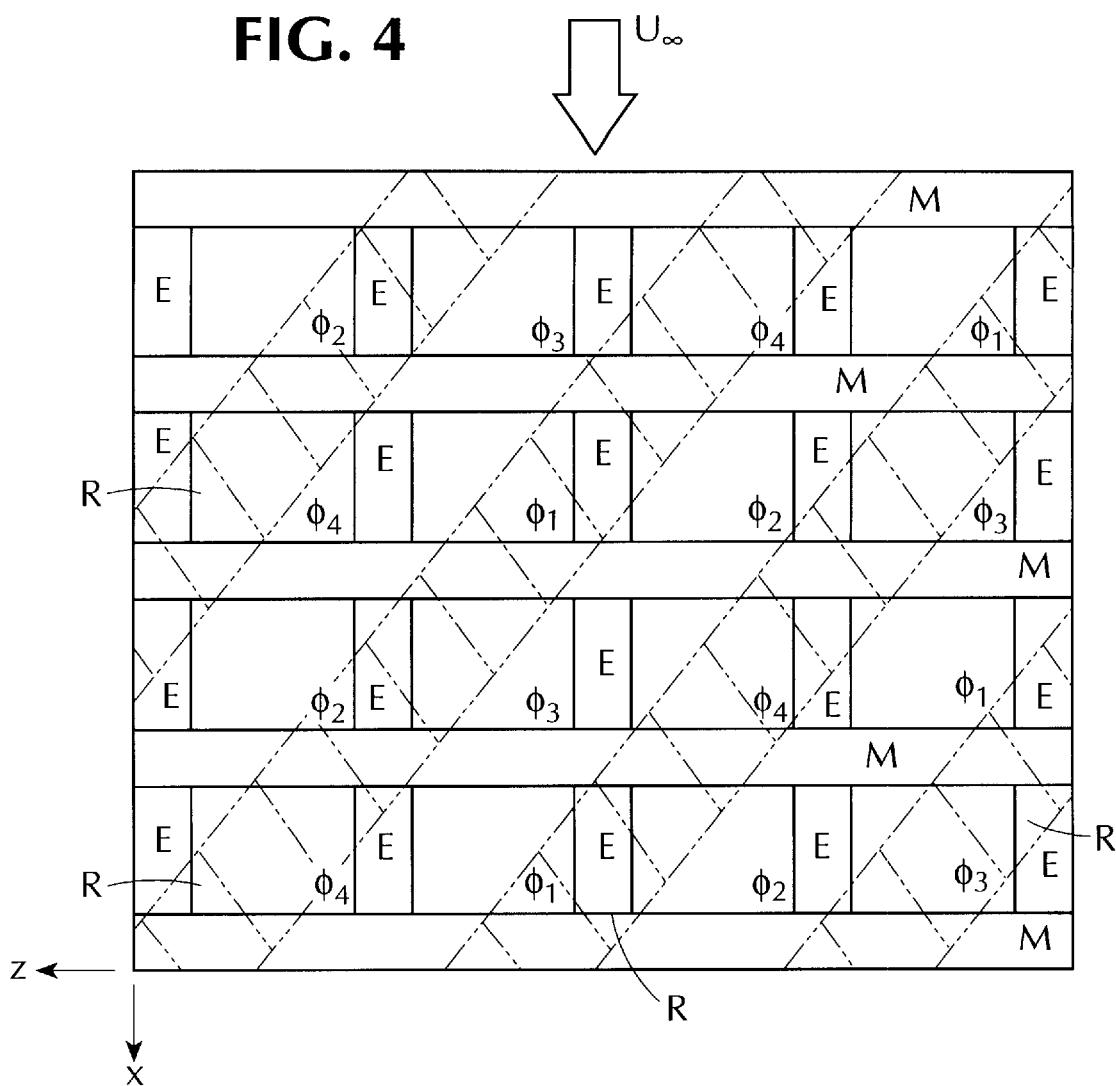
FIG. 4 is a stylized representation of the flow resulting when a two-dimensional array of control region tiles is actuated in accordance with the technique in U.S. Pat. NO. 5,437,421.

U.S. Pat. No. 5,437,421 (see FIG. 4 thereof and its accompanying text) explains that gradients in the Lorentz force $\overline{L}$ generate vorticity in the near-wall region of the flow. A similar mechanism is at work with the embodiment shown in FIG. 6 herein. In this embodiment, as in the embodiment shown in FIG. 10 of U.S. Pat. No. 5,437,421, the gradients in $\overline{L}$ are created by components of $\overline{L}$ in all directions, generated because the lines of magnetic flux and electric current in the flow at the edges or fringes of each control region tile actually curve as they enter and leave the surface of the plate, as discussed below in more detail.

U.S. Pat. No. 5,437,421 considers the flow from the standpoint of the velocity profile in the boundary layer resulting from actuating an array of control region tiles as discussed in that patent. As the patent notes, drag D can be expressed in terms of the boundary layer velocity profile u(y) as follows:

$$D = \rho \int_0^\infty \frac{u(y)}{U_\infty} \left(1 - \frac{u(y)}{U_\infty}\right) dy \tag{4}$$

where $\rho$ is the fluid's mass density.

Figure 5:
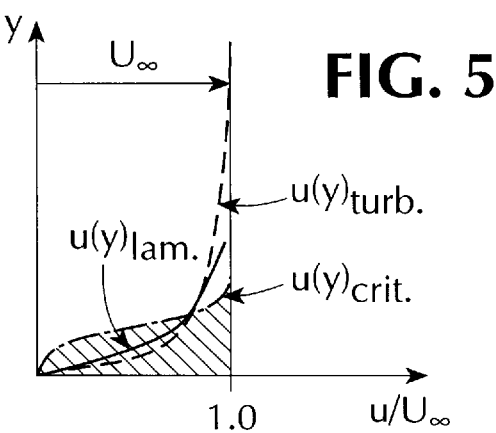
FIG. 5 conceptually depicts approximate conventional laminar and turbulent boundary layer velocity profiles and the boundary layer velocity profile $u(y)_{crit.}$ in the flow represented in FIG. 4.

The term in parentheses in equation 4 can be considered a measure of the "lost momentum" caused by the fluid velocity going to zero at the surface of the plate. Increasing that term increases the drag on the plate, since the "lost momentum" is manifested in a force on the plate in the x-direction. That term represents the area under the curve u(y) in FIG. 5, meaning that at any given location on the plate, drag is reduced by the invention disclosed in U.S. Pat. No. 5,437,421.

However, as the physics of the fluid flow created by that invention are understood, one reason the invention is effective in reducing drag is because the flow conditions forced by the array and actuation pattern used therein can be considered to be a resonant phenomenon. That is, even though each actuation of a given control tile region generates only an incremental amount of vorticity in the fluid at a given location of each control region, actuation at just the right time of other regions over which such fluid passes continually reinforces local vorticity until the flow is forced to organize as explained in the patent.

But subsequent investigations revealed that the drag reduction is not uniform in the spanwise (z) direction and that drag reduction would either peak over a fairly narrow range of Lorentz-force magnitudes (that is, for a narrow range of voltages applied to the electrodes) or would simply approach an upper limit no matter how much voltage was applied to the electrodes.

In considering those phenomena, it was realized that another way of analyzing the flow control described in U.S. Pat. No. 5,437,421 is by viewing it from the perspective of the vorticity distribution in the flow rather than the resulting velocity profile. Only then can it be appreciated that the manner in which the flow is forcibly reorganized also causes local longitudinal vorticity concentrations. The present invention takes advantage of that insight by inhibiting or, ideally, eliminating the localized concentrations of longitudinal vorticity along the array, while still achieving the drag reduction obtained by generating vorticity in the flow using the Lorentz force generated by electromagnetic control region tiles.

FIG. 7 is a highly schematic representation of the physical mechanisms underlying the present invention. It is a computer-generated visualization of notional values of the parameters shown therein under certain assumed conditions. FIG. 7(a) illustrates schematically the path taken by the electric current density $\overline{J}$ between two electrodes 407 bounding a single tile 406 of the array shown in FIG. 6. As FIG. 7(a) shows, the electric current density has components in the x- and y-directions, particularly near the fringes of the tile, although the predominant component is in the z-direction from one electrode to the other. FIG. 7(b) shows the same phenomenon for the magnetic field $\overline{B}$. It has components in the y-direction, particularly near the magnets, although the predominant component is in the x-direction. The magnetic field has no appreciable z-component since the magnets in the array shown in FIG. 6 extend continuously in the z-direction; at the ends of the magnets the field would have z-components like the current shown in FIG. 7(a). Accordingly, a resulting Lorentz force field can be represented as shown in FIG. 7(c), where $\overline{L}=\overline{J}\times\overline{B}=[L_x,L_y,L_z]$ over the entire control region, and each arrow notionally represents the Lorentz force at the tip of the arrow.

As those skilled in the art will appreciate, the equation for the momentum at any given point in the flow will include the Lorentz force $\overline{L}=\overline{J}\times\overline{B}$. Since the equation for the vorticity is the curl of the momentum equation, the vorticity equation will include the term $\nabla\times(\overline{J}\times\overline{B})$, where $\nabla$ is the known mathematical "curl" or "del" operator expressed by the relation:

$$\nabla\times\overline{A} = \begin{vmatrix} \overline{i} & \overline{j} & \overline{k} \\ \frac{\partial}{\partial x} & \frac{\partial}{\partial y} & \frac{\partial}{\partial z} \\ A_x & A_y & A_z \end{vmatrix}$$

Figure 7A:
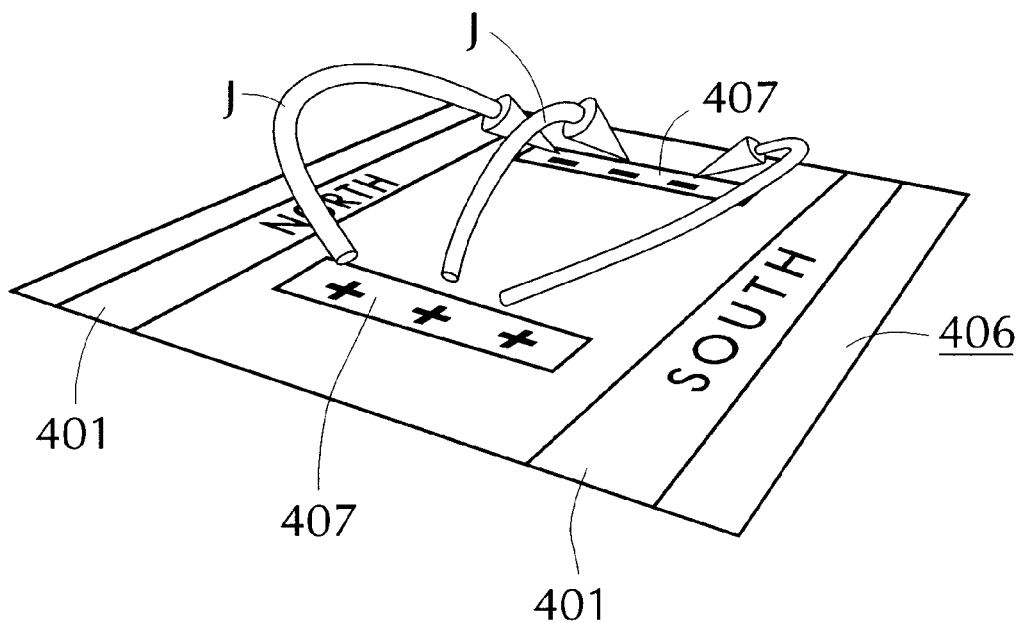
FIGS. 7(a) to 7(d), is a mathematically generated depiction of various forces and fields created in the fluid.
Figure 7B:
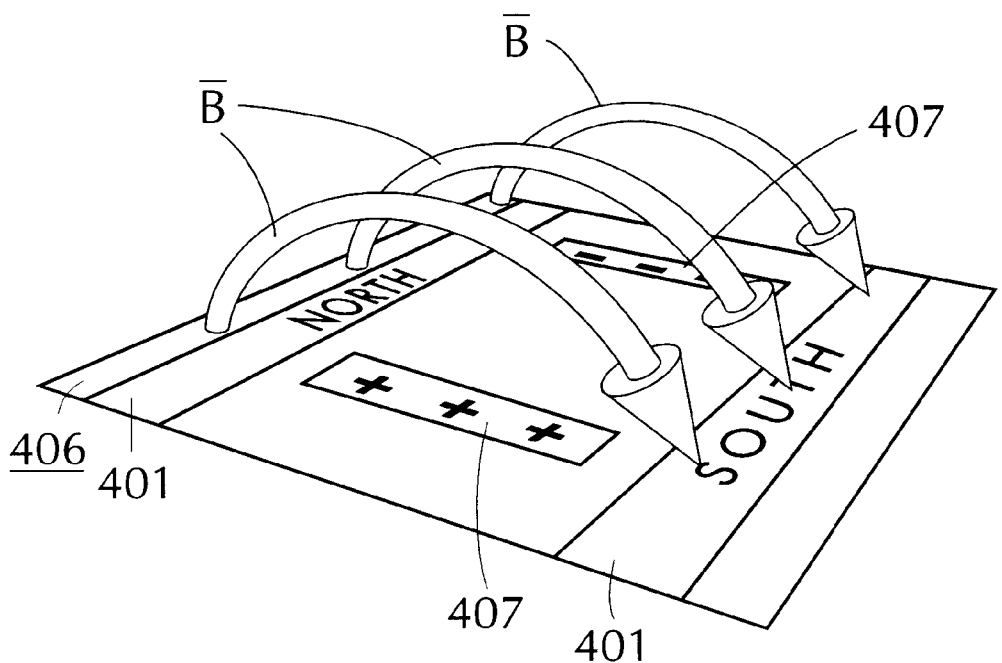
Figure 7C:
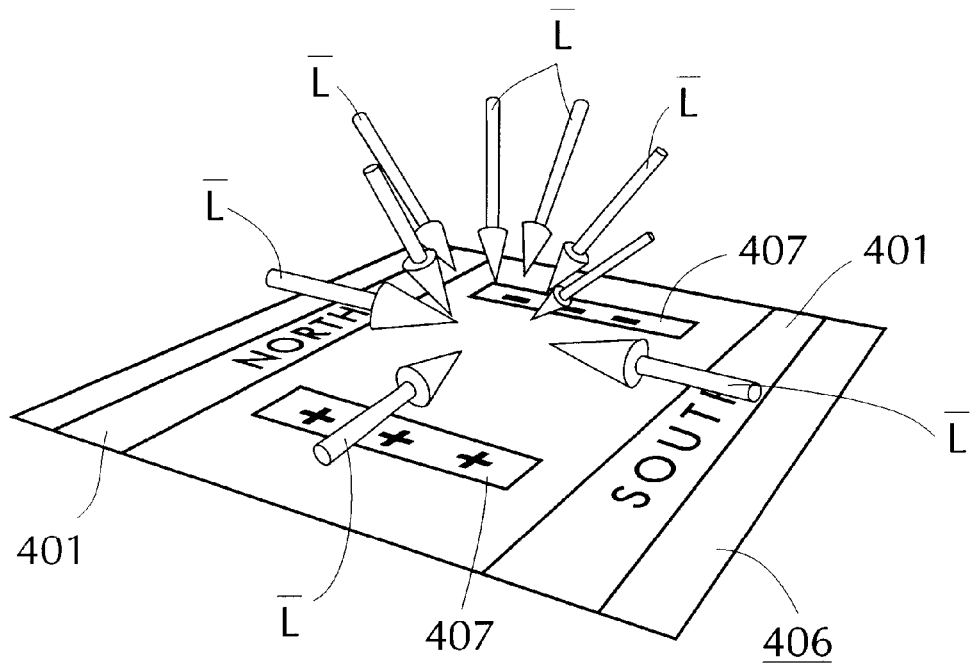
Figure 7D:
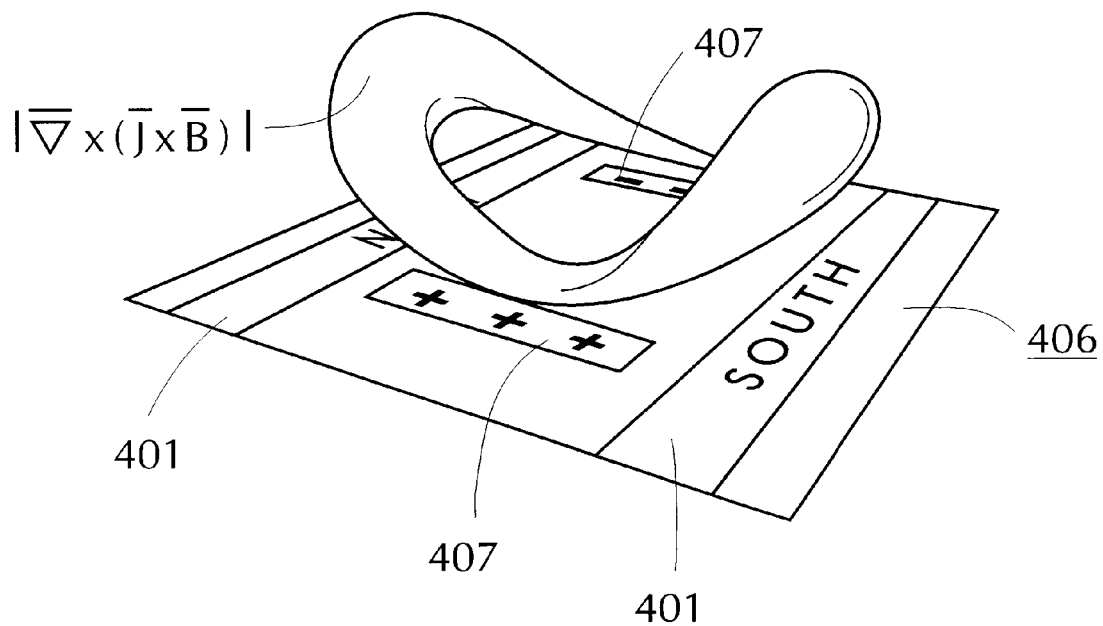

Thus, the Lorentz force $\overline{L}=\overline{J}\times\overline{B}$ (strictly speaking, the curl of the Lorentz force) is a source of vorticity in the flow over a two-dimensional array of tiles, since actuation of different tiles in a pattern results in a Lorentz force $\overline{L}(x,y,z,t)$ over the entire array. A purely notional depiction of the vorticity generated by the presence of the Lorentz force can be visualized as shown in FIG. 7(d), which plots those points over an actuated control region for which the magnitude of $\nabla\times(\overline{J}\times\overline{B})$ is a constant value. FIG. 7(d) thus enables visualization in a qualitative manner of the nature of the vorticity generated by actuation of one control region tile for the $\overline{J}\times\overline{B}$ field represented in FIG. 7(c).

As noted above, the insight leading to the present invention was the realization that the flow should be considered from the standpoint of vorticity distribution over the array rather than the resulting velocity profile in the boundary layer. That approach led to the present invention, and the significant additional drag reduction achieved with it, as compared even with the large drag reductions obtained with the technique discussed in U.S. Pat. No. 5,437,421.

Vorticity $\overline{\omega}$ is generally defined in accordance with the following equation:

$$\overline{\omega}=\nabla\times\overline{u} \tag{5}$$

For spanwise vorticity (that is, $\omega_z$), equation 5 gives the following relation:

$$\omega_z = \frac{\partial u_y}{\partial x} - \frac{\partial u_x}{\partial y} \tag{6}$$

where $u_x$ and $u_y$ are the fluid velocity components in the x and y directions, respectively.

It will be appreciated that $\partial u_y/\partial x$ goes to zero at the wall, so that $$\omega_z\bigg|_{wall} = -\frac{\partial u_x}{\partial y}\bigg|_{wall} \tag{7}$$

Comparing equation 7 with equations 1 and 2, it is seen that drag thus depends on the z-component of $\omega$ at y=0 (that is, $\omega_{z,0}$). Accordingly, reducing $\omega_{z,0}$ (the spanwise vorticity at the wall) will reduce drag.

Figure 8A:
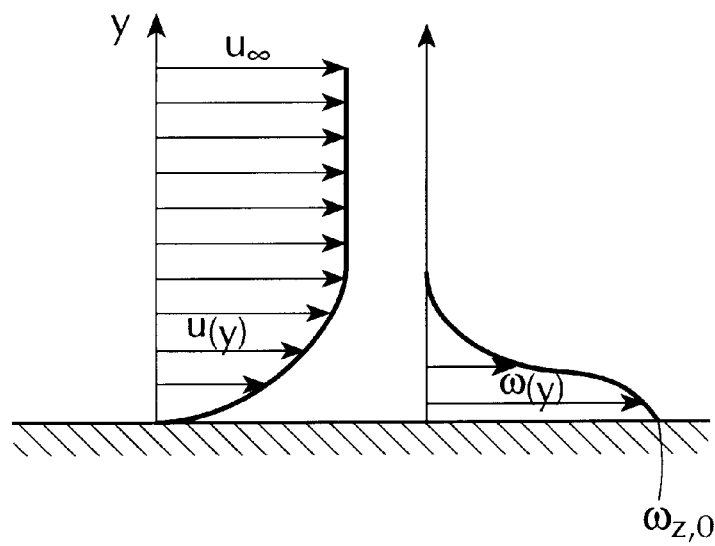
FIG. 8(a) schematically depicts the velocity and spanwise vorticity profiles in a boundary layer on a flat plate without the flow control of the present invention.
Figure 8B:
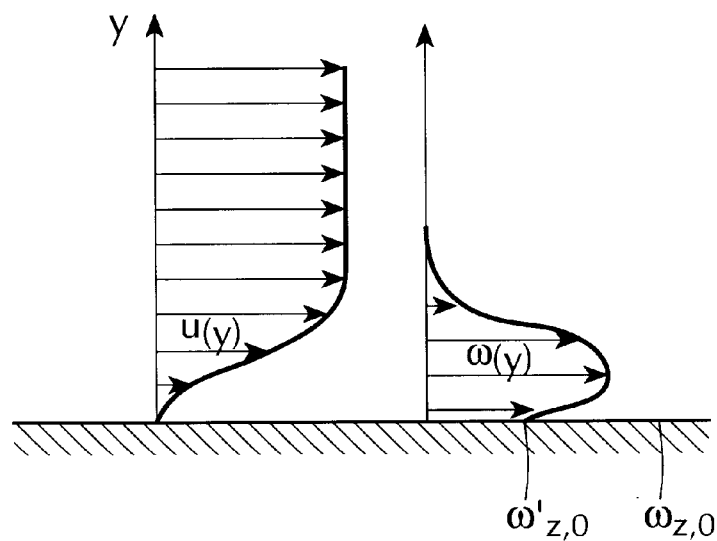
FIG. 8(b) schematically depicts such profiles in flow controlled according to the present invention.

The schematic representations in FIGS. 8(a) and 8(b) illustrate this phenomenon. (The minus signs for the abscissas of the plots of $\omega(y)$ are omitted for clarity.)

FIG. 8(a) indicates the velocity and $\omega_z$ profiles (the z-direction being perpendicular to the plane of the paper). The velocity profile shown in FIG. 8(a) results in the depicted $\omega_{z,0}$ in accordance with equation 7.

A velocity profile like that in FIG. 8(b) results from actuation of the array shown in FIG. 6 as described above. Since it is qualitatively similar to $u(y)_{crit.}$ in FIG. 5, it will result in reduced drag according to equation 4, also. And, since $\partial u_x/\partial y$ is smaller, it likewise results in a reduction of $\omega_{z,0}$ to $\omega'_{z,0}$.

The present invention achieves even more dramatic reductions in drag because it reduces spanwise vorticity at the wall ($\omega_{z,0}$), while also introducing vorticity into the flow such that the longitudinal vorticity induced by one control region is largely cancelled by the longitudinal vorticity induced by downstream control regions. The prior approach in U.S. Pat. No. 5,437,421 caused vorticity in the longitudinal (x) direction to become concentrated in localized regions. This limited the amount of drag reduction in accordance with the following principles.

Those skilled in the art will realize immediately that actuation of a given control region tile does not change the total vorticity in the flow. While it changes the vorticity distribution, it actually introduces equal amounts of positive- and negative-sense vorticity. Physical principles (namely, conservation of angular momentum) require that equal amounts of negative-sense and positive-sense vorticity be introduced in the spanwise and longitudinal directions because the total induced vorticity must be zero in the flow being controlled.

It was realized that with the previous arrangement the positive and negative longitudinal vorticity introduced into the fluid by a given control region was reinforced as the fluid came under the influence of a later-actuated downstream control region. In fact, the goal of that invention actually is to actuate the control regions in a way that the vorticity introduced by one control region is reinforced by a subsequently-encountered control region.

Although the invention in U.S. Pat. No. 5,437,421 provided startling drag reductions, the present invention proceeds from the realization that the reductions in drag achieved with that invention were actually the result of reducing near-wall vorticity in the spanwise direction (that is, $\omega_{z,0}$, see FIG. 8) by the redistribution of the velocity profile in the boundary layer. When considered from the standpoint of the vorticity distribution, it was realized that the previous approach forced the flow into a regime that reinforced the longitudinal (that is, streamwise) vorticity $\omega_x$, which is known to be a significant cause of viscous drag.

Longitudinal vorticity is known to be essential to the existence of a turbulent boundary layer, and therefore is a major source of viscous drag. See FIGS. 2 and 5, along with equations 1 and 2. In a turbulent boundary layer counter-rotating longitudinal vortices occur somewhat regularly in the spanwise (z) direction. It has been observed experimentally that such vortices lead to the lift-up of near-wall fluid, with the subsequent replenishment of that fluid with high-speed free-stream fluid (the so-called "burst-sweep" phenomenon). The prior invention actually reinforced that longitudinal vorticity, thus perforce limiting drag reduction. The present invention enables realization of even further drag reductions, even though physical principles make it impossible to avoid introducing longitudinal vorticity using the control regions of the invention.

It was found that an array according to FIG. 6, actuated by a suitable control circuit in accordance with the above description, introduces longitudinal vorticity in a manner in which downstream control regions tend to create longitudinal vorticity distributed such that it attenuates longitudinal vorticity created by upstream control regions. As a result, the drag reduction due to the decreased spanwise vorticity $\omega_z$ at the wall can be maximized.

FIG. 9 shows an alternate embodiment of the invention in which the control region tiles are aligned in the x-direction, but are actuated in a manner to provide the shaded actuated control regions, whereby the longitudinal vorticity concentration created by individual tiles is counteracted by that created downstream tiles, in accordance with the present invention.

For an array like that shown in FIG. 9, the actuation pattern is shown in Table 2:

TABLE 2

Figure 9A:
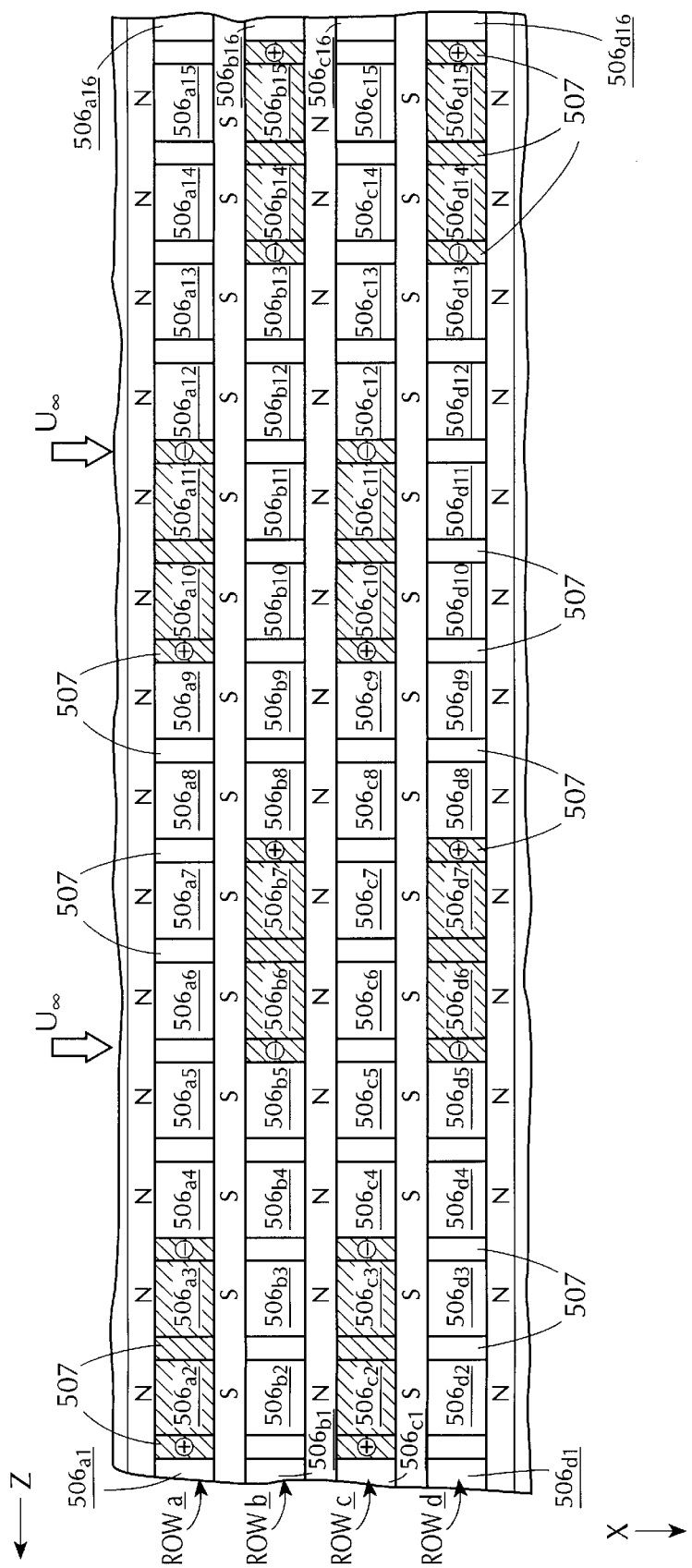

|  | Row a | Row b | Row c | Row d |
|---|---|---|---|---|
| $\phi_1$- | a2–a3, | b6–b7, | c2–c3, | d6–d7, |
| FIG. 9(a) | a10–a11, . . . | b14–b15, . . . | c10–c11, . . . | d14–d15, . . . |
| $\phi_2$- | a3–a4, | b7–b8, | c3–c4, | d7–d8, |
| FIG. 9(b) | a11–a12, . . . | b15–b16, . . . | c11–c12, . . . | d15–d16, . . . |
| $\phi_3$- | a4–a5, | b8–b9, | c4–c5, | d8–d9, |

TABLE 2-continued

Figure 9C:
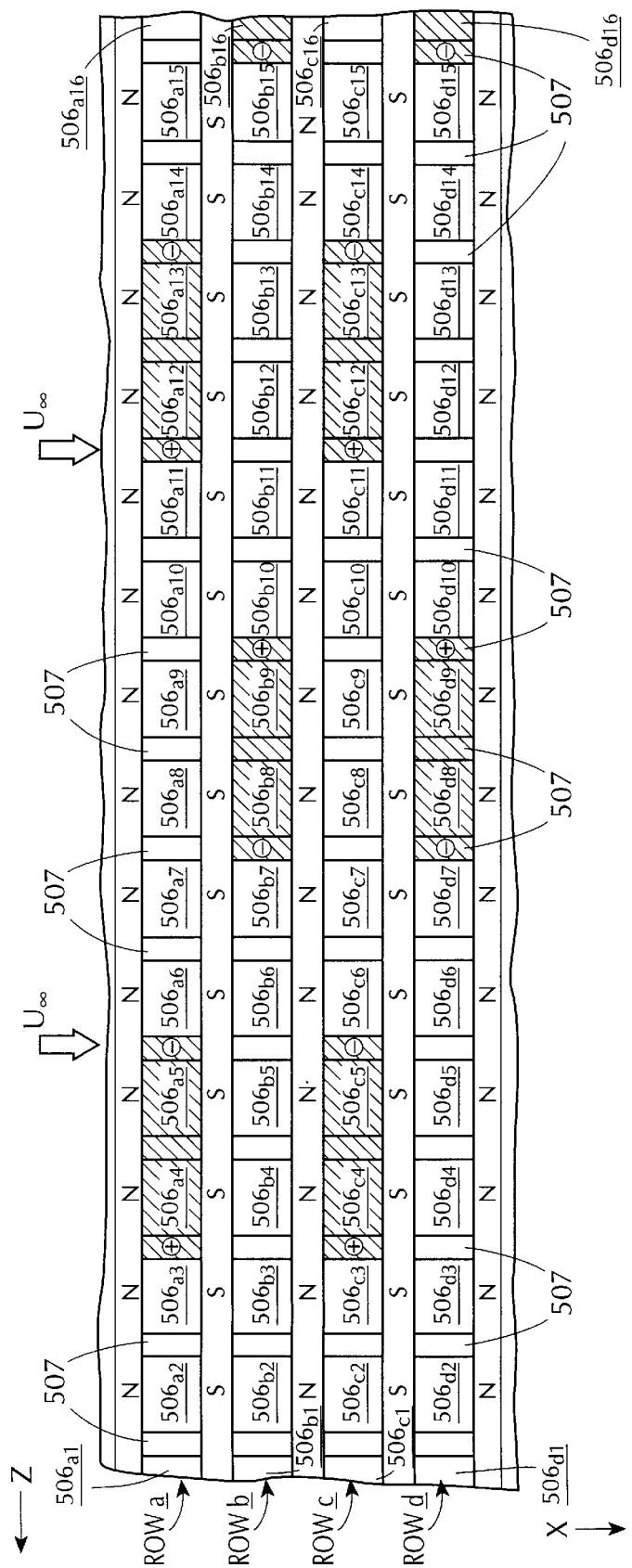
Figure 9D:
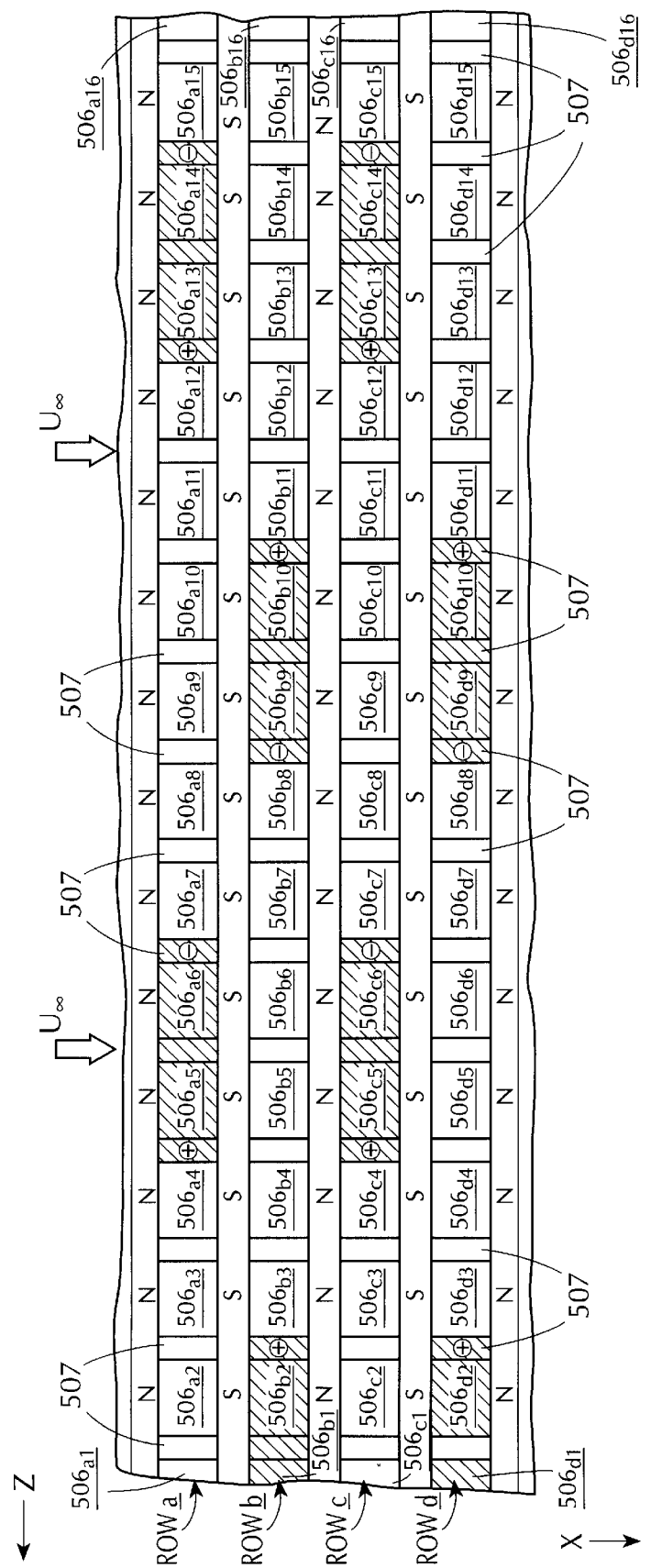
Figure 9F:
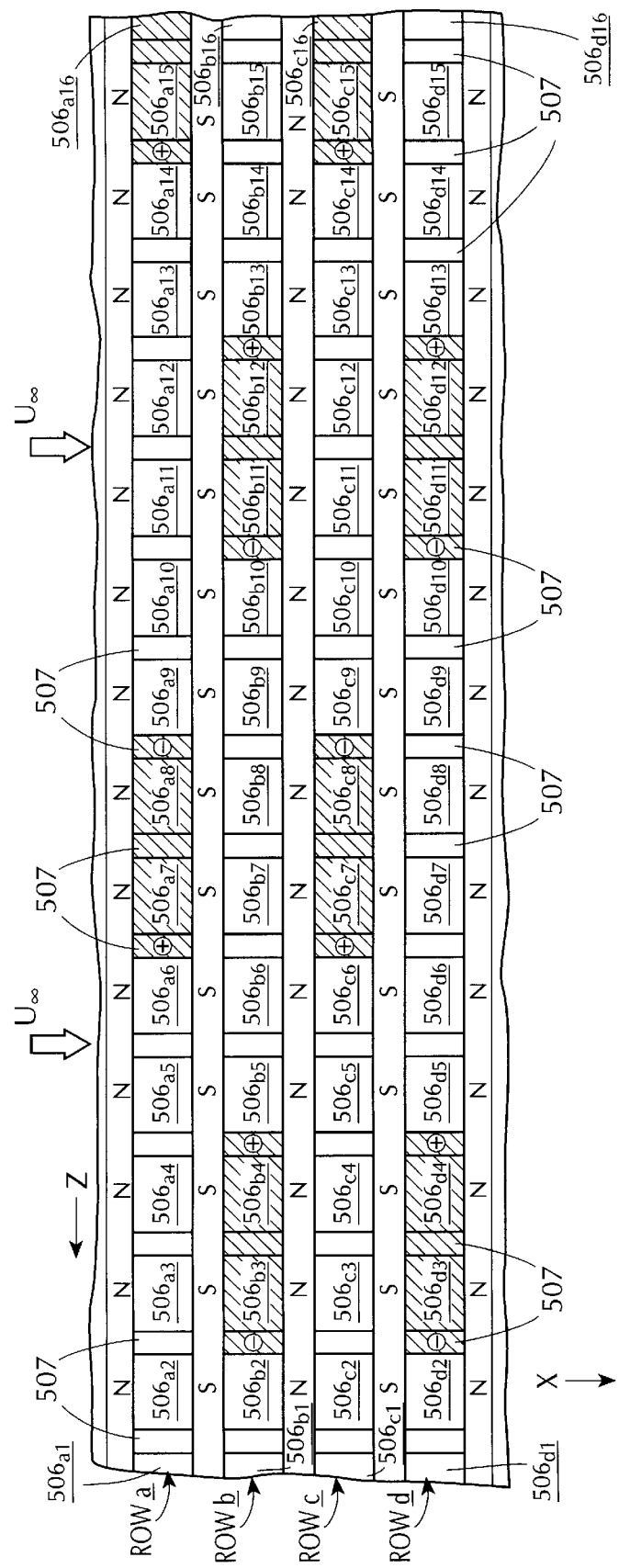
Figure 9G:
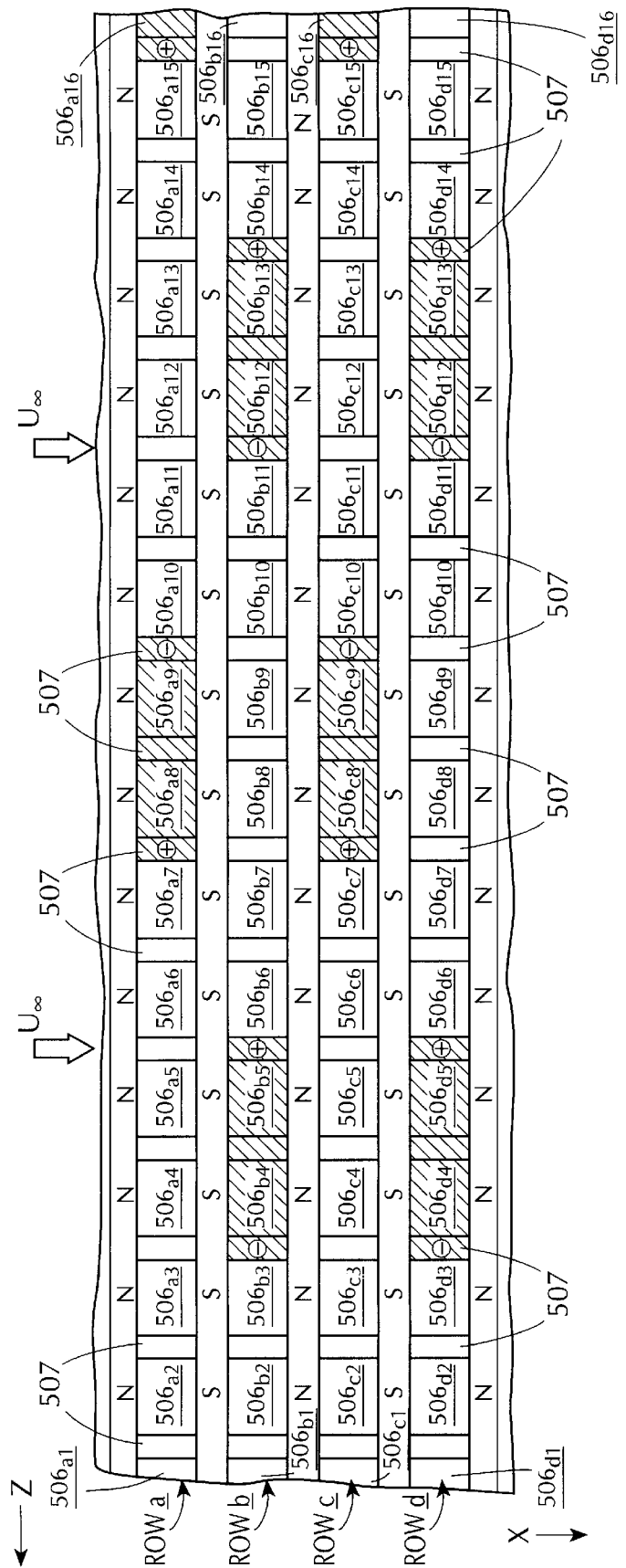
Figure 9H:
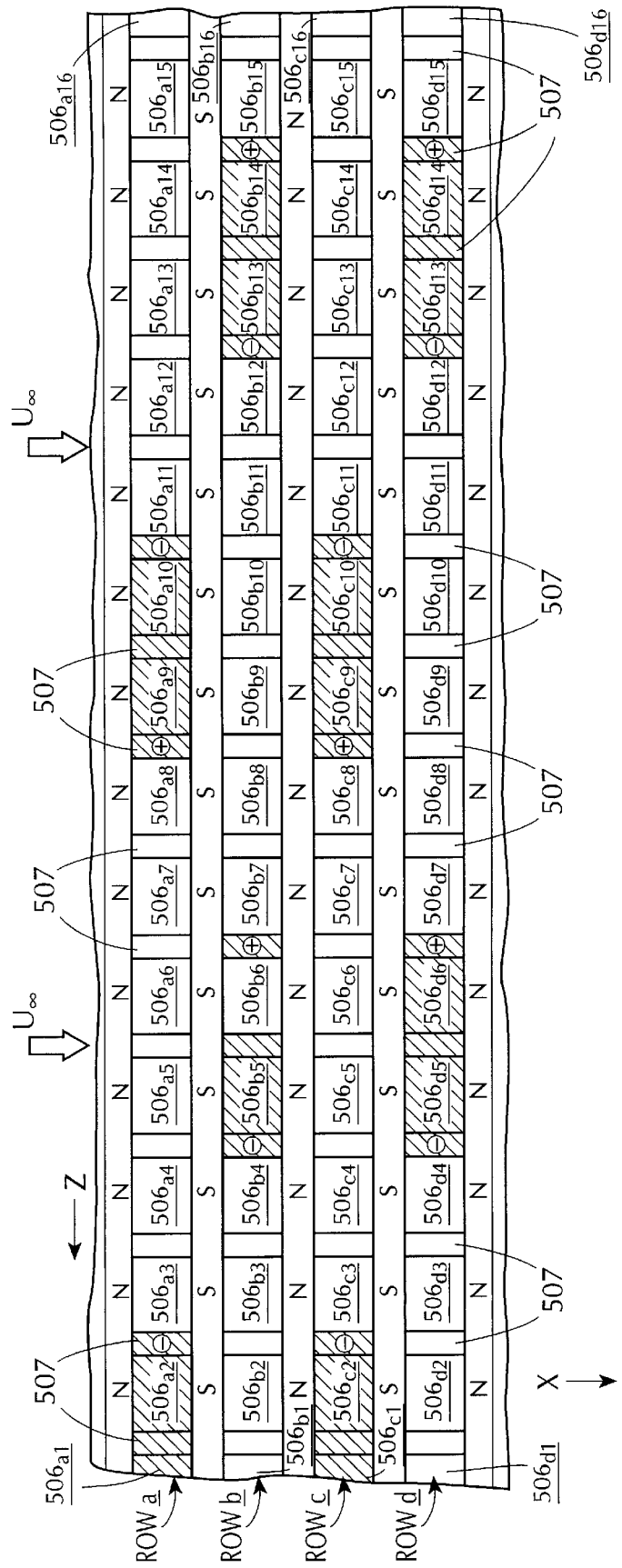

|  | Row a | Row b | Row c | Row d |
|---|---|---|---|---|
| FIG. 9(c) | a12–a13, . . . | b16–b17 . . . | c12–c13, . . . | d16–d17, . . . |
| $\phi_4$- | a5–a6, | b1–b2, | c5–c6, | d1–d2, |
| FIG. 9(d) | a13–a14, . . . | b9–b10, . . . | c13–c14, . . . | d9–d10, . . . |
| $\phi_5$- | a6–a7, | b2–b3, | c6–c7, | d2–d3, |
| FIG. 9(e) | a14–a15, . . . | b10–b11, . . . | c14–c15, . . . | d10–d11, . . . |
| $\phi_6$- | a7–a8, | b3–b4, | c7–c8, | d3–d4, |
| FIG. 9(f) | a15–a16, . . . | b11–b12, . . . | c15–c16, . . . | d11–d12, . . . |
| $\phi_7$- | a8–a9, | b4–b5, | c8–c9, | d4–d5, |
| FIG. 9(g) | a16–a17, . . . | b12–b13, . . . | c16–c17, . . . | d12–d13, . . . |
| $\phi_8$- | a1–a2, | b5–b6, | c1–c2, | d5–d6, |
| FIG. 9(h) | a9–a10, . . . | b13–b14, . . . | c9–c10, . . . | d13–d14, . . . |

The control region tiles, which are aligned in the x-direction in the embodiment of FIG. 9, are actuated in the eight-phase cycle depicted summarized in Table 2, at a 12.5% duty cycle for each phase. The frequency of actuation is determined as discussed above.

The following working example illustrates the present invention and verifies its theoretical basis as discussed above.

EXAMPLE

An array like that shown in FIG. 9 was tested in a flow channel similar to that shown in U.S. Pat. No. 5,437,421 (see FIG. 7). The dimensions of the channel were slightly modified from those discussed in the patent, and the test section was a closed circular cylinder completely filled with the flowing fluid. A test array was used with overall dimensions of about 0.22 meters (16 control regions) in the x-direction and about 0.072 meters (7 control regions) in the z-direction. The control regions were actuated in as discussed above in connection with FIG. 9. The test array included permanent magnets generating a peak transverse flux of about 0.4 gauss in the center of each tile. The tiles were actuated by passing a peak current in an order of magnitude of about 1.0 ma/cm$^2$ between the pertinent electrodes. The frequency of actuation was 5 Hz, with a 12.5% duty cycle, so that in 1.6 seconds all eight phases in a given actuation sequence are actuated. The flow velocity was about 7.50 cm/sec. The fluid was conductive (about 2.55 S/m), and a dye was used for flow visualization as discussed in the above-mentioned patent.

As a comparison example, equal-phase tiles were actuated as discussed in connection with FIG. 10 in the above-identified patent.

Figure 10A:
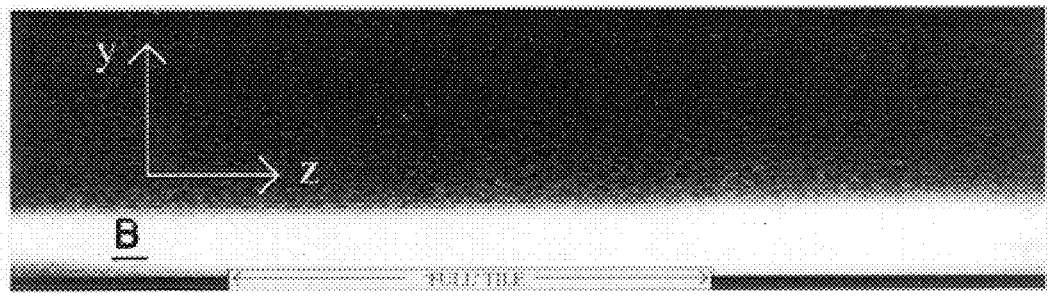
FIG. 10(a) depicts actual flow in a test set-up using an array that is not actuated.
Figure 10B:
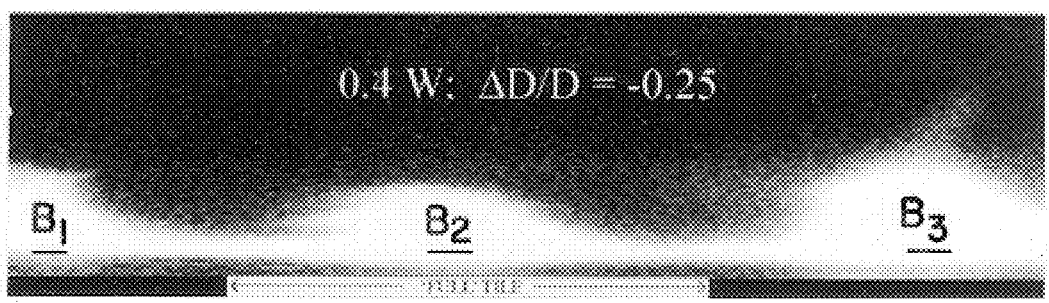
FIG. 10(b) depicts actual flow in the same test set-up using an array actuated in accordance with U.S. Pat. No. 5,437,421.
Figure 10C:
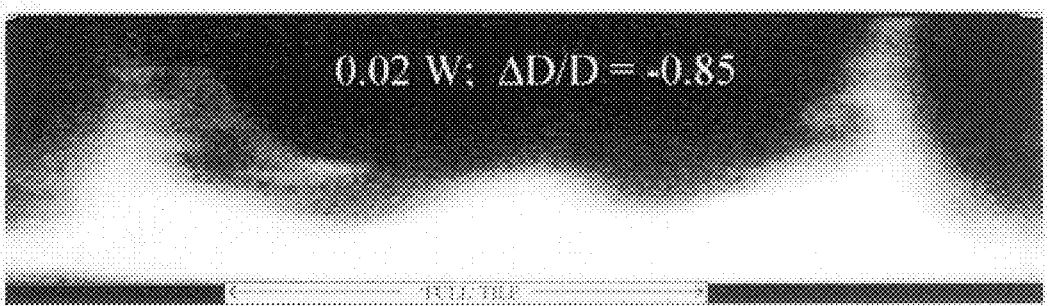
FIG. 10(c) depicts actual flow in the same test set-up using an array actuated in accordance with the present invention.

FIGS. 10(a) to 10(c) represent the results of the tests. The flow was visualized using a video recorder facing downstream in the x-direction (as indicated by the y-z axis at the top left of FIG. 10), with a thin sheet of laser energy applied in the boundary layer to cause the dye to fluoresce. (See FIG. 7 of U.S. Pat. No. 5,437,421.)

FIG. 10(a) shows the flow conditions with the array deactivated. The drag D on the plate having the array was measured. The bright region B represents flow in the boundary layer.

FIG. 10(b) shows the flow conditions with the array actuated in accordance with the invention described in the above-mentioned patent, with the total power applied to the electrodes being 0.4 watts. The drag was reduced by 25% as compared to the drag without any control regions actuated (FIG. 10(a)), that is, $\Delta D/D = -0.25$. In addition, the regions of strong rotational flow discussed in the patent (see FIGS. 11 and 12) can be clearly seen in FIG. 10(b) as regions $B_1$, $B_2$, $B_3$ of concentrated longitudinal vorticity that raise the boundary layer flow away from the surface.

FIG. 10(c) shows the flow conditions when the array is actuated according to the discussion above in connection with FIG. 9. The drag has been reduced 85% as compared to the array with no control regions actuated and 25% as compared to the prior art as shown in FIG. 10(b), with an applied power of only 0.02 watts (5% of that in FIG. 10(b)). FIG. 10(c) also shows that flow in the boundary layer has been lifted up more uniformly in the spanwise (z) direction, evidencing a decrease in $\omega_z$ at the wall (see FIG. 8(b)).

The raised-up bright regions $B_1$, $B_2$, $B_3$ in FIG. 10(b) indicate regions of enhanced longitudinal vorticity, since FIG. 10 is a view looking in the longitudinal (x) direction. FIG. 10(c) shows how the longitudinal vorticity variations have been reduced, indicating the results of reducing the concentrations of longitudinal vorticity by redistributing the vorticity introduced by the control region tiles to more uniformly increase spanwise vorticity and decrease $\omega_z$ at the surface (see FIG. 8(b)) along the spanwise direction. Even though the boundary layers depicted in these figures are laminar, the figures taken together confirm that the present invention attenuates the longitudinal vorticity concentrations introduced using the prior approach.

They also confirm the source of the variations in drag in the spanwise direction that occur when the flow is controlled in accordance with the invention described in U.S. Pat. No. 5,437,421. Accordingly, these experiments make it clear that the limits on drag reduction experienced with that invention are the result of the counter-productive influence of reinforcing rather than trying to cancel longitudinal vorticity in the boundary layer.

It will be appreciated that magnetic boundary layer control devices such as discussed above could be provided on any surface upon which it is desired to control the boundary layer.

The present invention provides a device that is simple to manufacture as discrete elements and which could be easily retrofit to craft presently in operation. Accordingly, the magnetic boundary layer control devices could be easily manufactured in large volume and delivered to a site of operation of the craft upon which it is to be installed. The devices could be easily fitted on the inside skin of the craft, for example on a submarine sail, with a minimum amount of time and effort.

Of course, it will be appreciated that the invention may take forms other than those specifically described, and the scope of the invention is to be determined solely by the following claims.

What is claimed is:

1. An apparatus for controlling a boundary layer in a flow of an electrically conductive fluid moving relative to a surface in a free-stream direction, said apparatus comprising:

a plurality of selectively actuatable control region tiles distributed over the surface in an array extending in the free-stream direction and a direction transverse thereto, each said tile being bounded by magnetic field generating means for generating in the fluid a magnetic field $\overline{B}(x,y,z,t)$ having flux lines with a predetermined orientation with respect to the free-stream direction and electric current generating means for generating in the fluid an electric current density $\overline{J}(x,y,z,t)$ traversing the magnetic flux lines such that actuation of a particular tile generates a magnetic field $\overline{B}$ and electric current density $\overline{J}$ that create in the flow a force $\overline{L}(x,y,z,t)=\overline{J}\times\overline{B}$ and introduce a resulting vorticity distribution $\omega$ (x,y,z,t); and control means for selectively actuating said tiles to create control regions that introduce a vorticity distribution into the flow over each said control region such that over said array the vorticity at the wall in the direction transverse to the free-stream direction is reduced and creation of boundary layer vorticity concentrations in the free-stream direction is inhibited.

2. An apparatus according to claim 1, wherein said array comprises a plurality of adjacent rows of said control region tiles, each said row including a plurality of said tiles.

3. An apparatus according to claim 2, wherein said magnetic field generating means comprises a plurality of parallel magnets and said electric current generating means comprises a plurality of parallel electrodes between said magnets.

4. An apparatus according to claim 3, wherein said magnets comprise permanent magnets extending generally in the direction transverse to the free-stream direction and said electrodes extend generally in the free-stream direction.

5. An apparatus according to claim 4, wherein adjacent said control region tiles in adjacent said rows are offset.

6. An apparatus according to claim 5, wherein:

each said control region tile has substantially the same dimension as the other said control region tiles in the free-stream direction and the direction transverse thereto;

each said control region tile is offset from each said control region tile in an adjacent said row by distance of one-half the dimension of said tiles in the direction transverse to the free-stream direction; and said control means is constructed for actuating every fourth control region tile in every other said row by actuating said electrodes comprising said control region tile, with actuated said control region tiles in every other said row being aligned and in adjacent said rows being offset by a complete control region tile, said control means actuating adjacent said control region tiles in each said row sequentially so that each said control region tile in said row is actuated for 25% of the period required for actuation of all of said control region tiles in said row.

7. An apparatus according to claim 4, wherein adjacent said control region tiles in adjacent said rows are aligned.

8. An apparatus according to claim 7, wherein:

each said control region tile has substantially the same dimension as the other said control region tiles in the free-stream direction and the direction transverse thereto; and said control means is constructed for actuating said electrodes in a manner creating an actuated control region by actuating said two electrodes bounding said actuated control region, with said actuated control regions in every other said row being aligned and in adjacent said rows being midway between said actuated control regions in an adjacent said row, said control means actuating adjacent said electrodes in each row sequentially so that each actuated control region in each said row is actuated for 12.50% of the period required for actuation of all of said actuated control regions in said row.

9. An apparatus according to claim 1, wherein the electric current density $\overline{J}$ is spatially constant for an actuated tile.

10. An apparatus according to claim 9, wherein the magnetic field $\overline{B}$ is spatially constant for an actuated tile.

11. An apparatus according to claim 1, wherein said magnetic field generating means is disposed for providing a magnetic field having flux lines perpendicular to the electric current generated by said electric current generating means.

12. An apparatus according to any one of claims 1 to 8, wherein the surface comprises a lifting surface.

13. An apparatus according to claim 12, wherein said lifting surface is a control surface.

* * * * *

UNITED STATES PATENT AND TRADEMARK OFFICE
CERTIFICATE OF CORRECTION

PATENT NO. : 5,964,433
DATED : October 12, 1999
INVENTOR(S) : DANIEL M. NOSENCHUCK It is certified that error appears in the above-identified patent and that said Letters Patent is hereby corrected as shown below:

ON THE TITLE PAGE:

item [57] Abstract

Line 9, "an" should read --a--.

Column 3

Line 2, close up the left margin;

Line 3, close up right margin.

Column 4

Line 33, "(b)" should read --3(b)--.

Signed and Sealed this

Eleventh Day of July, 2000

Attest:

Q. TODD DICKINSON

Attesting Officer

Director of Patents and Trademarks